United States Patent
Mohammed et al.

(10) Patent No.: US 12,154,103 B1
(45) Date of Patent: Nov. 26, 2024

(54) SYSTEM AND METHOD FOR DYNAMIC ALLOCATION OF TRANSACTION-BOUND ATTRIBUTES USING MACHINE LEARNING MODELS

(71) Applicant: Loyalty Juggernaut, Inc, Palo Alto, CA (US)

(72) Inventors: Azeem Mohammed, Hyderabad (IN); Kalpak Shah, Palo Alto, CA (US); Shyam Shah, Palo Alto, CA (US)

(73) Assignee: LOYALTY JUGGERNAUT, INC, Palo Alto, CA (US)

( * ) Notice: Subject to any disclaimer, the term of this patent is extended or adjusted under 35 U.S.C. 154(b) by 0 days.

(21) Appl. No.: 18/617,527

(22) Filed: Mar. 26, 2024

(51) Int. Cl.
*G06Q 20/38* (2012.01)
*G06Q 20/40* (2012.01)
*G06Q 30/0226* (2023.01)

(52) U.S. Cl.
CPC ....... *G06Q 20/382* (2013.01); *G06Q 20/4016* (2013.01); *G06Q 30/0226* (2013.01)

(58) Field of Classification Search
None
See application file for complete search history.

(56) References Cited

U.S. PATENT DOCUMENTS

| | | | | |
|---|---|---|---|---|
| 10,304,070 | B2* | 5/2019 | Newnham | G06Q 30/0239 |
| 2005/0144066 | A1* | 6/2005 | Cope | G06Q 40/00 |
| | | | | 705/35 |
| 2010/0076890 | A1* | 3/2010 | Low | G06Q 20/3267 |
| | | | | 705/44 |
| 2011/0029370 | A1* | 2/2011 | Roeding | H04W 4/021 |
| | | | | 705/14.38 |
| 2015/0228018 | A1* | 8/2015 | Richman | G06Q 30/0226 |
| | | | | 705/38 |

* cited by examiner

Primary Examiner — Jamie R Kucab

(57) ABSTRACT

A method for dynamically allocating transaction-bound attributes associated with at least one member account by generating a personalized waiting period of the transaction-bound attributes using a machine learning model is provided. The method includes (i) performing a first machine learning (ML) model on a historical transaction dataset, a historical member dataset, and a historical entity dataset, (ii) training a second machine learning model based on correlation and patterns in (a) the predicted transaction dataset, (b) the predicted member dataset, and (c) the predicted entity dataset, (iii) dynamically generating the personalized waiting period for the transaction-bound attributes using the second machine learning model, (iv) dynamically determining, using the second machine learning model, the personalized waiting period for the transaction-bound attributes that are placed in the pending state, and (v) dynamically allocating the transaction-bound attributes associated with at least one member account based on the generated personalized waiting period of the transaction-bound attributes.

15 Claims, 8 Drawing Sheets

AIRLINES

BIT DETAILS — 302

BIT DATE: 03/04/2024 02:09
CATEGORY: ACCRUAL
TYPE:
SPONSOR: ABC AIRWAYS
LOCATION:
PROCESSED ON: 03/04/2024 02:09

○ BIT DETAILS
○ LOG
● POINTS
○ PRIVILEGES
○ UPDATES

[ CANCEL ]

HEADER

BIT ID: WJEXB7E9A22CJOJO4EH9OHVJ    MEMBER ID: C_A0124A02633 — 304
H_REPRESENTATIVE ID: 268    H_PROGRAM ID: 242

DETAILS OF TRANSACTION BOUND ATTRIBUTES — 306

| ACCURED | TAG | STATE | EXPIRATION DATE |
|---|---|---|---|
| 1000 | BONUS | AVAILABLE | 05/05/2024 |
| BOOKING ONE-WAY FLIGHT TICKET WITH AN ECONOMY SEAT | | | |
| 110 | SUNDAY BONUS | AVAILABLE | NEVER |
| BEVERAGES ORDERED | | | |
| 2000 | BASE | AVAILABLE | 17/04/2024 |
| BOOKING ROUND TRIP FLIGHT E-TICKET WITH AN ECONOMY CLASS | | | |

<<< PREVIOUS     NEXT >>>

Figure 3B:
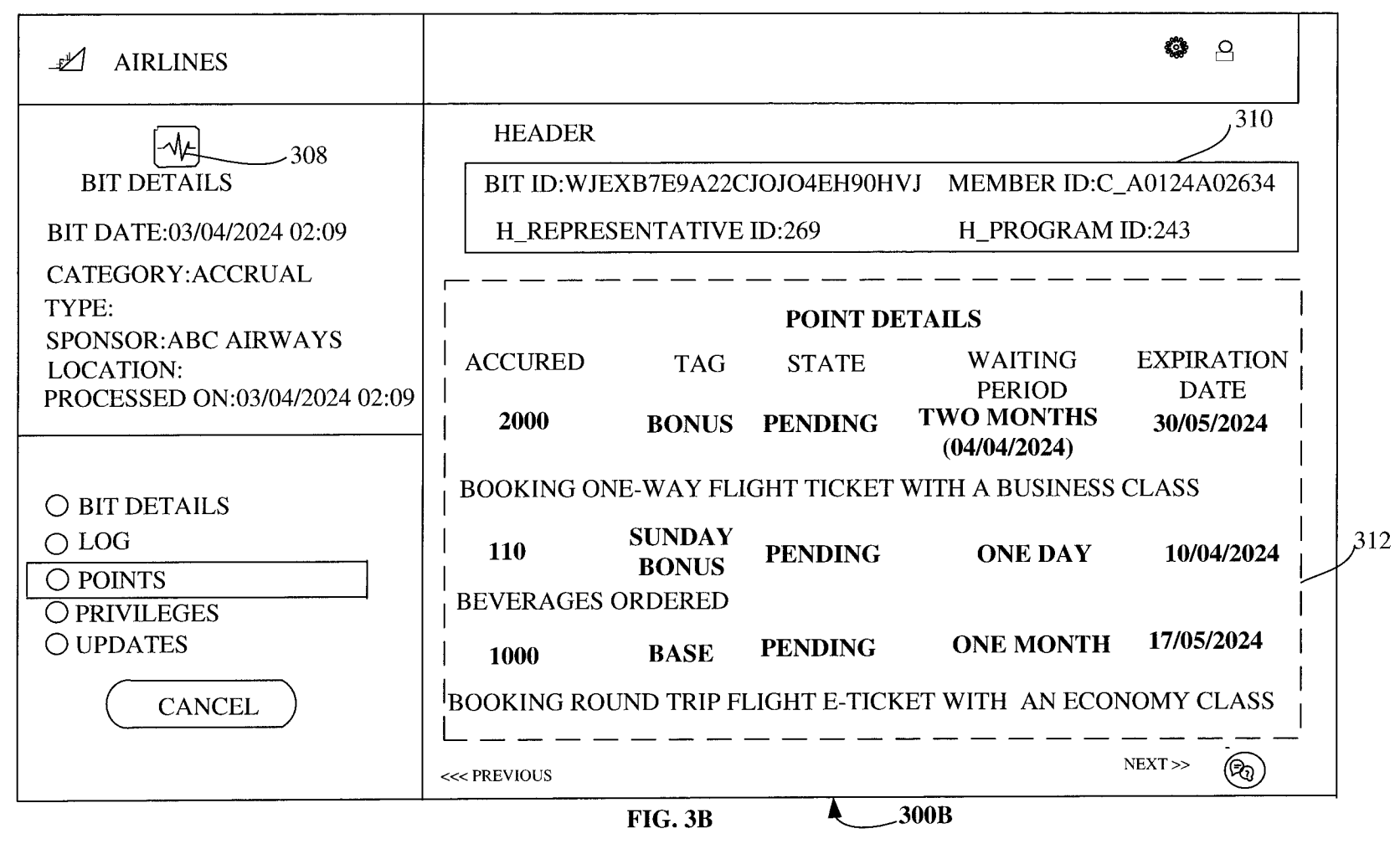

✈ AIRLINES    ⚙ ⌕

BIT DETAILS  [〰] — 308

BIT DATE:03/04/2024 02:09
CATEGORY:ACCRUAL
TYPE:
SPONSOR:ABC AIRWAYS
LOCATION:
PROCESSED ON:03/04/2024 02:09

○ BIT DETAILS
○ LOG
○ POINTS
○ PRIVILEGES
○ UPDATES ( CANCEL )

HEADER

BIT ID:WJEXB7E9A22CJOJO4EH9OHVJ   MEMBER ID:C_A0124A02634 — 310
H_REPRESENTATIVE ID:269   H_PROGRAM ID:243

POINT DETAILS ⌐ ─ ─ ─ ─ ─ ─ ─ ─ ─ ─ ─ ─ ─ ─ ─ ─ ─ ─ ─ ─ ─ ─ 312

| ACCURED | TAG | STATE | WAITING PERIOD | EXPIRATION DATE |
|---|---|---|---|---|
| 2000 | BONUS | PENDING | TWO MONTHS (04/04/2024) | 30/05/2024 |
| BOOKING ONE-WAY FLIGHT TICKET WITH A BUSINESS CLASS | | | | |
| 110 | SUNDAY BONUS | PENDING | ONE DAY | 10/04/2024 |
| BEVERAGES ORDERED | | | | |
| 1000 | BASE | PENDING | ONE MONTH | 17/05/2024 |
| BOOKING ROUND TRIP FLIGHT E-TICKET WITH AN ECONOMY CLASS | | | | |

<<< PREVIOUS                           NEXT >>>    ℗

PERFORMING, USING A PROCESSOR, A FIRST MACHINE LEARNING (ML) MODEL ON A HISTORICAL TRANSACTION DATASET OF MEMBERS PERFORMING TRANSACTIONS WITH ENTITIES TO OBTAIN A PREDICTED TRANSACTION DATASET THAT HAS A RISK LEVEL ASSIGNED TO EACH TRANSACTION IN THE HISTORICAL TRANSACTION DATASET, PERFORMING, USING THE PROCESSOR, THE FIRST ML MODEL ON A HISTORICAL MEMBER DATASET TO OBTAIN A PREDICTED MEMBER DATASET THAT HAS A RISK LEVEL ASSIGNED TO EACH MEMBER IN THE HISTORICAL MEMBER DATASET,THE HISTORICAL MEMBER DATA INCLUDES ONE OR MORE (A) A MEMBER IDENTIFIER, (B) A MEMBER CATEGORY, (C) A TOTAL SPENDING, (D) A NUMBER OF RETURNS, AND (E) A FRAUDULENT ACTIVITY HISTORY, AND PERFORMING, USING THE PROCESSOR, THE FIRST ML MODEL ON A HISTORICAL ENTITY DATASET TO OBTAIN A PREDICTED ENTITY DATASET THAT HAS A RISK LEVEL ASSIGNED TO EACH ENTITY IN THE HISTORICAL ENTITY DATASET, THE HISTORICAL ENTITY DATA INCLUDES ONE OR MORE (A) AN ENTITY IDENTIFIER, (B) AN ENTITY TYPE, (C) AN AVERAGE TRANSACTION VALUE, (D) A HISTORICAL FRAUD LEVEL, AND (E) A HISTORICAL REFUND REQUEST LEVEL
402

TRAINING A SECOND MACHINE LEARNING (ML) MODEL BASED ON CORRELATION AND PATTERNS IN (A) THE PREDICTED TRANSACTION DATASET, (B) THE PREDICTED MEMBER DATASET, AND (C) THE PREDICTED ENTITY DATASET
404

DYNAMICALLY GENERATING THE PERSONALIZED WAITING PERIOD FOR THE TRANSACTION-BOUND ATTRIBUTES USING THE SECOND ML MODEL, THE PERSONALIZED WAITING PERIOD IS GENERATED BY (I) OBTAINING THE TRANSACTION-BOUND ATTRIBUTES FOR EACH TRANSACTION ASSOCIATED WITH AT LEAST ONE MEMBER ACCOUNT WHEN THE TRANSACTION-BOUND ATTRIBUTES ARE ISSUED TO THE AT LEAST ONE MEMBER ACCOUNT ASSOCIATED WITH THE AT LEAST ONE MEMBER UPON EACH TRANSACTION BEING PERFORMED BY THE AT LEAST ONE MEMBER, (II) DETERMINING, USING THE SECOND ML MODEL, THE PERSONALIZED STATE OF THE TRANSACTION-BOUND ATTRIBUTES FOR EACH MEMBER ACCOUNT, AND (III) DYNAMICALLY DETERMINING IN REAL-TIME, USING THE SECOND ML MODEL WITH A SET OF RULES, THE PERSONALIZED WAITING PERIOD FOR THE TRANSACTION-BOUND ATTRIBUTES THAT ARE PLACED IN THE PENDING STATE BY ANALYZING AT LEAST ONE OF LOCATION OF EACH TRANSACTION, A TRANSACTION TYPE, A PERSONA OF THE AT LEAST ONE MEMBER, OR PRODUCT CATEGORY ASSOCIATED WITH THE TRANSACTION-BOUND ATTRIBUTES, THE PERSONALIZED STATE INCLUDES A PENDING STATE OR AN AVAILABLE STATE, THE TRANSACTION-BOUND-ATTRIBUTES IN THE PENDING STATE ARE STORED IN A HOLDING UNIT, THE TRANSACTION-BOUND-ATTRIBUTES IN THE PENDING STATE ARE STORED IN A HOLDING UNIT
406

DYNAMICALLY ALLOCATING THE TRANSACTION-BOUND ATTRIBUTES ASSOCIATED WITH AT LEAST ONE MEMBER ACCOUNT BASED ON THE GENERATED PERSONALIZED WAITING PERIOD OF THE TRANSACTION-BOUND ATTRIBUTES, THEREBY SECURING THE ALLOCATION OF THE TRANSACTION-BOUND ATTRIBUTES AGAINST ANOMALOUS TRANSACTIONS
408

FIG. 4B

SYSTEM AND METHOD FOR DYNAMIC ALLOCATION OF TRANSACTION-BOUND ATTRIBUTES USING MACHINE LEARNING MODELS

BACKGROUND

Technical Field

The embodiments herein generally relate to attribute allocation for enterprises on large data sets using a machine learning model, more particularly, to a method and system for dynamically allocating transaction-bound attributes associated with at least one member account by generating a personalized waiting period of the transaction-bound attributes using a machine learning model.

Description of the Related Art

Loyalty programs have become a vital strategy for enterprises to enhance customer retention and attract new business. The loyalty programs usually have a reward points system through which the customers are rewarded for making a purchase or using a service. However, the effectiveness of loyalty programs is often challenged in management of the reward distribution. In many cases, the reward points are rewarded to a customer which they can utilize for purchasing or availing certain predetermined services or products. This system is not problem-free and there are technical challenges in managing such transaction-related activities, especially on large data sets. Different enterprises may have different currencies or reward point structures. Also, the reward points may only be redeemed against certain rewards available to the customers holding exclusive points of that enterprise. Nonetheless, such loyalty programs are susceptible to manipulation. For example, fraudsters could take advantage of a loyalty program by making purchases solely to accumulate the reward points, and subsequently returning purchased items or services and secure refunds, availing products or services using reward points gained by making such purchases. The loyalty program needs to ensure that if a purchase is refunded or if a financial transaction is canceled, the customer should not be rewarded with any redeemable points. Currently, the data shows that airlines handle approximately half a million flight-booking transactions over a year and generally 10% of the flight-booking transactions end up being canceled. Consequently, this cancellation process leads to a refund of around $1 million worth of loyalty points. However, the refunded points, amounting to $1 million, do not return to the system and are often misused by members of the loyalty program. There are existing misuse prevention approaches, for example, scheduled job systems, or transactional history-based discrimination.

In an existing approach of scheduled job systems, the scheduled job is initiated to transition reward points from a pending status to an available status after a return period has lapsed. However, the scheduled job systems run for a specified duration like a few minutes or hours, where during a specified duration, certain members or customers might be unable to utilize their reward points that should have been accessible in their available points status. Further, a lot of computing resources are required, particularly when dealing with extensive membership bases, for example, airlines numbering in the millions or beyond. Additionally, continuous monitoring of the scheduled job is difficult which leads to inaccuracy which may lead to negative consequences about customer satisfaction and loyalty. For example, if the scheduled job fails, that provides a negative customer experience due to customers being unable to use their justly availed reward points.

Another existing system for calculating available reward points is based on transaction history of the member. However, such systems result in increased latency in checking reward points and processing the reward points for redemption during the runtime. The increased latency is proportional to the historical transaction volume of the member. Moreover, such systems require more computation resources and memory to process and store the historical transaction data of the members. Consequently, program managers are burdened with manual responsibility of determining an escrow period, member status, and transaction distribution. This manual decision-making in the existing system is both time-intensive and subjective, carrying a risk of human inaccuracies. Also, running such a system is expensive for businesses due to human and computer resources costs. Moreover, the existing system highly limits an enterprise's ability to adapt to changing behaviors and preferences of their customers, especially when the customer dataset is larger.

Therefore, there remains a need for a system and method for intelligent allocation of rewards and determining a waiting period for redemption of rewards to safeguard against any misuse of loyalty reward systems.

SUMMARY

In view of the foregoing, there is provided a processor-implemented method for dynamic allocation of transaction-bound attributes associated with at least one member account by generating a personalized waiting period of the transaction-bound attributes using a machine learning model, thereby securing the allocation of the transaction-bound attributes against anomalous transactions. The method includes performing, using a processor, a first machine learning (ML) model on a historical transaction dataset of members performing transactions with entities to obtain a predicted transaction dataset that has a risk level assigned to each transaction in the historical transaction dataset. The method includes performing, using the processor, the first ML model on a historical member dataset to obtain a predicted member dataset that has a risk level assigned to each member in the historical member dataset. The historical member data includes one or more (a) a member identifier, (b) a member category, (c) a total spending, (d) a number of returns, and (e) a fraudulent activity history. The method includes performing, using the processor, the first ML model on a historical entity dataset to obtain a predicted entity dataset that has a risk level assigned to each entity in the historical entity dataset. The historical entity data includes one or more (a) entity identifiers, (b) an entity type, (c) an average transaction value, (d) a historical fraud level, and (e) a historical refund request level. The method includes training a second machine learning model (ML) based on correlation and patterns in (a) the predicted transaction dataset, (b) the predicted member dataset, and (c) the predicted entity dataset. The method includes dynamically generating the personalized waiting period for the transaction-bound attributes using the second ML model. The personalized waiting period is generated by (i) obtaining the transaction-bound attributes for each transaction associated with at least one member account when the transaction-bound attributes are issued to the at least one member account associated with the at least one member upon each transaction being performed by the at least one member, (ii) determining, using the second ML model, the personalized state of the transaction-bound attributes for each member account. The personalized state includes a pending state or an available state, and (iii) dynamically determining in real-time, using second the machine learning model with a set of rules, the personalized waiting period for the transaction-bound attributes that are placed in the pending state by analyzing at least one of location of each transaction, a transaction type, a persona of the at least one member, or product category associated with the transaction-bound attributes. The transaction-bound-attributes in the pending state are stored in a holding unit. The method includes dynamically allocating the transaction-bound attributes associated with at least one member account based on the generated personalized waiting period of the transaction-bound attributes, thereby securing the allocation of the transaction-bound attributes against anomalous transactions.

This method enables dynamic allocation of the transaction-bound attributes based on the personalized waiting period and the personalized defer decision. This method integrates an automated attributes status movement mechanism that eliminates a need for manual interventions and scheduled jobs, reduces compute and storage requirements, and improves system efficiency. This method enables a real-time summation of pending attributes, providing immediate availability of transaction-bound attributes for redemption. This eliminates a latency associated with calculating available attributes from the transaction-bound attributes, resulting in faster and more responsive attribute or reward checking and redemption processing. This method enhances decision-making processes by incorporating machine-learning models and a data-driven approach. This method utilizes machine-learning models to determine waiting periods, member statuses, and transaction allocations based on historical data, member behavior, and a set of rules. This improves accuracy, reduces manual effort, and enables dynamic adaptation to changing member preferences.

This method utilizes a separate table, such as the holding unit, which optimizes the storage and retrieval of pending transaction-bound attributes. By utilizing the TTL that automates the expiration of pending attributes, the system enables efficient data management and minimizes storage overhead. The automation of attributes status movement, elimination of scheduled jobs, and efficient storage management contribute to optimization of computational resources. The reduction in the compute and storage requirements translates into lower infrastructure costs for loyalty programs. This method provides immediate attributes availability that improves member satisfaction and engagement. The automation of attribute processing and real-time availability reduces manual effort. This improves overall operational efficiency, allowing to allocation of attributes more effectively.

In some embodiments, the method includes automatically determining in real-time, upon receiving an available transaction-bound attributes redemption request from a user device, available transaction-bound attributes for the at least one member account based on the personalized waiting period of the transaction-bound attributes that are pending. The transaction-bound attributes within the holding unit are automatically moved to the available transaction-bound attributes upon the expiration of the personalized waiting period of the transaction-bound attributes in the pending state based on a time-to-live (TTL).

In some embodiments, the TTL is a numerical value utilized for data validity or expiration means data should remain valid and available over a period in the holding unit.

In some embodiments, the method further includes training the second ML model which further includes performing at least one of (a) data cleaning method, (b) data preparation method, and (c) data normalization method on the (i) the predicted transaction dataset, (ii) the predicted member dataset, and (iii) the predicted entity dataset.

In some embodiments, the transaction-bound attributes in the available state are determined by subtracting the transaction-bound attributes in the pending state from the transaction-bound attributes.

In one aspect, a system for dynamically allocating transaction-bound attributes associated with at least one member account by generating a personalized waiting period of the transaction-bound attributes using a machine learning model, thereby securing the allocation of the transaction-bound attributes against anomalous transactions. The system includes a memory that includes a set of instructions and a processor that executes the set of instructions. The processor is configured to perform a first machine learning (ML) model on a historical transaction dataset of members performing transactions with entities to obtain a predicted transaction dataset that has a risk level assigned to each transaction in the historical transaction dataset. The processor is configured to perform the first ML model on a historical member dataset to obtain a predicted member dataset that has a risk level assigned to each member in the historical member dataset. The historical member data includes one or more (a) a member identifier, (b) a member category, (c) a total spending, (d) a number of returns, and (e) a fraudulent activity history. The processor is configured to the first ML model on a historical entity dataset to obtain a predicted entity dataset that has a risk level assigned to each entity in the historical entity dataset. The historical entity data includes one or more (a) entity identifier, (b) an entity type, (c) an average transaction value, (d) a historical fraud level, and (e) historical refund request levels. The processor is configured to train a second ML model based on correlation and patterns in (a) the predicted transaction dataset, (b) the predicted member dataset, and (c) the predicted entity dataset. The processor is configured to dynamically generate the personalized waiting period for the transaction-bound attributes using the second ML model. The personalized waiting period is generated by (i) obtaining the transaction-bound attributes for each transaction associated with at least one member account when the transaction-bound attributes are issued to the at least one member account associated with the at least one member upon each transaction being performed by the at least one member, (ii) determining, using the second ML model, the personalized state of the transaction-bound attributes for each member account, and (iii) dynamically determining in real-time, using the second ML model with a set of rules, the personalized waiting period for the transaction-bound attributes that are placed in the pending state by analyzing at least one of location of each transaction, a transaction type, a persona of the at least one member, or product category associated with the transaction-bound attributes. The personalized state includes a pending state or an available state. The transaction-bound-attributes in the pending state are stored in a holding unit. The processor is configured to dynamically allocate the transaction-bound attributes associated with at least one member account based on the generated personalized waiting period of the transaction-bound attributes, thereby securing the allocation of the transaction-bound attributes against anomalous transactions.

This system required less computational power and functionality to manage large data sets. The system eliminates the need for computer resource-intensive scheduled job systems with fixed durations and minimizes computational resource requirements. The system leverages machine learning models to dynamically allocate transaction-bound attributes, preventing misuse and manipulation. Through a nuanced analysis of historical activities, demographics, and transaction behaviors, the system optimally determines whether attributes should be in a pending or available state, ensuring precise and automated attribute distribution.

In some embodiments, the processor is configured to automatically determine in real-time, upon receiving an available transaction-bound attributes redemption request from a user device, available transaction-bound attributes for the at least one member account based on the personalized waiting period of the transaction-bound attributes that are pending. The transaction-bound attributes within the holding unit are automatically moved to the available transaction-bound attributes upon the expiration of the personalized waiting period of the transaction-bound attributes in the pending state based on a time-to-live (TTL).

In some embodiments, the TTL is a numerical value utilized for data validity or expiration means data should remain valid and available over a period in the holding unit.

In some embodiments, the processor is further configured to train the second ML model which further includes performing at least one of (a) data cleaning method, (b) data preparation method, and (c) data normalization method on the (i) the predicted transaction dataset, (ii) the predicted member dataset, and (iii) the predicted entity dataset.

In some embodiments, the transaction-bound attributes in the available state are determined by subtracting the transaction-bound attributes in the pending state from the transaction-bound attributes.

In one aspect, one or more non-transitory computer-readable storage mediums store one or sequences of instructions, which when executed by one or more processors, causes a method for dynamic allocation of transaction-bound attributes associated with at least one member account by generating a personalized waiting period of the transaction-bound attributes using a machine learning model, thereby securing the allocation of the transaction-bound attributes against anomalous transactions. The method includes performing a first machine learning (ML) model on a historical transaction dataset of members performing transactions with entities to obtain a predicted transaction dataset that has a risk level assigned to each transaction in the historical transaction dataset. The method includes performing the first ML model on a historical member dataset to obtain a predicted member dataset that has a risk level assigned to each member in the historical member dataset. The historical member data includes one or more (a) a member identifier, (b) a member category, (c) a total spending, (d) a number of returns, and (e) a fraudulent activity history. The method includes performing, the first ML model on a historical entity dataset to obtain a predicted entity dataset that has a risk level assigned to each entity in the historical entity dataset. The historical entity data includes one or more (a) an entity identifier, (b) an entity type, (c) an average transaction value, (d) a historical fraud level, and (e) historical refund request level. The method includes training a second machine learning (ML) model based on correlation and patterns in (a) the predicted transaction dataset, (b) the predicted member dataset, and (c) the predicted entity dataset. The method includes dynamically generating the personalized waiting period for the transaction-bound attributes using the second ML model. The personalized waiting period is generated by (i) obtaining the transaction-bound attributes for each transaction associated with at least one member account when the transaction-bound attributes are issued to the at least one member account associated with the at least one member upon each transaction being performed by the at least one member, (ii) determining, using the second ML model, the personalized state of the transaction-bound attributes for each member account, and (iii) dynamically determining in real-time, using the second ML model with a set of rules, the personalized waiting period for the transaction-bound attributes that are placed in the pending state by analyzing at least one of location of each transaction, a transaction type, a persona of the at least one member, or product category associated with the transaction-bound attributes. The personalized state includes a pending state or an available state. The transaction-bound-attributes in the pending state are stored in a holding unit. The method includes dynamically allocating the transaction-bound attributes associated with at least one member account based on the generated personalized waiting period of the transaction-bound attributes, thereby securing the allocation of the transaction-bound attributes against anomalous transactions.

The one or more non-transitory computer-readable storage mediums are of advantage in that the one or more non-transitory computer-readable storage mediums enhance computational efficiency and functionality of systems that manage large datasets. The need for computer resource-intensive scheduled job systems with fixed durations is eliminated and computational resource requirements are minimized.

Machine learning models are leveraged to dynamically allocate transaction-bound attributes, preventing misuse and manipulation. Through a nuanced analysis of historical activities, demographics, and transaction behaviors, it is determined whether attributes should be in a pending or available state, ensuring precise and automated attribute distribution.

One or more non-transitory computer-readable storage mediums storing one or sequences of instructions, which when executed by one or more processors, further includes automatically determining in real-time, upon receiving an available transaction-bound attributes redemption request from a user device, available transaction-bound attributes for the at least one member account based on the personalized waiting period of the transaction-bound attributes that are pending. The transaction-bound attributes within the holding unit are automatically moved to the available transaction-bound attributes upon the expiration of the personalized waiting period of the transaction-bound attributes in the pending state based on a time-to-live (TTL)

One or more non-transitory computer-readable storage mediums storing one or sequences of instructions, which when executed by one or more processors, the TTL is a numerical value utilized for data validity or expiration means data should remain valid and available over a period in the holding unit.

One or more non-transitory computer-readable storage mediums storing one or sequences of instructions, which when executed by one or more processors, further includes training the second ML model which further includes performing at least one of (a) data cleaning method, (b) data preparation method, and (c) data normalization method on the (i) the predicted transaction dataset, (ii) the predicted member dataset, and (iii) the predicted entity dataset.

One or more non-transitory computer-readable storage mediums storing one or sequences of instructions, which when executed by one or more processors, the transaction-bound attributes in the available state are determined by subtracting the transaction-bound attributes in the pending state from the transaction-bound attributes.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A is an exemplary diagram of a user interface view that displays transaction-bound attributes of member ID and a personalized state of transaction-bound attributes according to some embodiments herein;

FIG. 3B is an exemplary diagram of a user interface view that displays transaction-bound attributes of member ID and a personalized state of transaction-bound attributes according to some embodiments herein;

FIG. 3C is an exemplary diagram of a user interface view that consolidated transaction-bound attributes of member ID over one month of FIG. 3B according to some embodiments herein;

FIGS. 4A and 4B are flow diagrams that illustrate a method for dynamically allocating transaction-bound attributes associated with at least one member account by generating a personalized waiting period of the transaction-bound attributes using a machine learning model according to some embodiments herein.

DETAILED DESCRIPTION OF PREFERRED EMBODIMENTS

Figure 1:
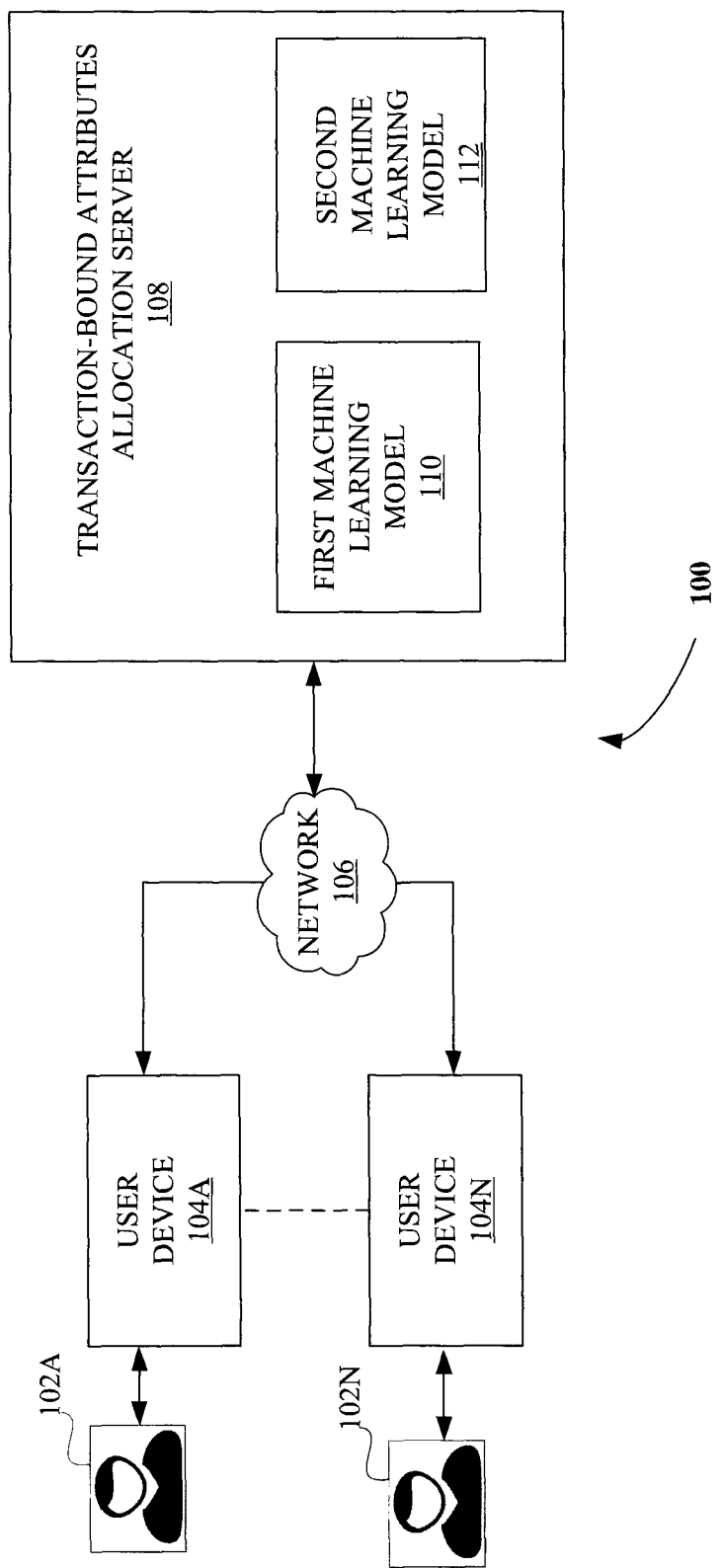
FIG. 1 is a block diagram of a system for dynamically allocating transaction-bound attributes associated with at least one member account by generating a personalized waiting period of the transaction-bound attributes using a machine learning model, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for dynamic allocation of transaction-bound attributes based on a personalized waiting period of the transaction-bound attributes that is determined using a machine learning model associated with a member account. Referring now to the drawings, and more particularly to FIGS. 1 to 5, where similar reference characters denote corresponding features consistently throughout the figures, there are shown preferred embodiments.

Definitions

Predicted waiting period: The machine learning dynamically determines the waiting period for points to become available for redemption. This is a significant departure from static waiting periods in traditional rewards programs. By analyzing data like member behavior, purchase history, and perhaps market trends, the machine learning can optimize the waiting period to balance member satisfaction with business objectives.

Predicted member dataset: The machine learning model decides which members should receive attributes in a pending status versus those who can use their attributes immediately. This decision is based on machine learning analysis, likely considering factors like the member's loyalty status, transaction history, and engagement levels. This targeted approach can enhance customer experience by rewarding reliable members instantly while managing risk by delaying attribute availability for others.

Predicted transaction dataset: The machine learning model determined the status of attribute allocation (pending or immediate) on a transaction-by-transaction basis. This allows for a nuanced approach where not all transactions are treated equally. Factors that could influence this decision might include the type of purchase, transaction amount, the member's past spending behavior, or even external factors like current market conditions.

The transaction-bound attributes and transaction-bound points are used interchangeably in the specification.

FIG. 1 is a block diagram of a system 100 for dynamically allocating transaction-bound attributes associated with at least one member account by generating a personalized waiting period of the transaction-bound attributes using a machine learning model according to some embodiments herein. The system 100 includes one or more user devices 104A-N associated with one or more members 102A-N and a transaction-bound attributes allocation server 108. The transaction-bound attributes allocation server 108 includes a first machine learning (ML) model 110 and a second machine learning (ML) model 112. The user device 104A is communicatively connected to the transaction-bound attributes allocation server 108 through a network 106 to receive transaction-bound attributes. The first ML model 110 is a predictive machine learning model.

The transaction-bound attributes are issued to each of the one or more members 102A-N after each transaction is performed by the one or more members 102A-N. For example, the transaction may be a purchase transaction, a flight transaction, a dining transaction, a subscription transaction, an entertainment transaction, a grocery shopping transaction, an online shopping transaction, a credit card transaction, or a ride-sharing transaction. In some embodiments, the network 106 is wired. In some embodiments, the network 106 is a wireless network based on at least one Wi-Fi or Bluetooth. In some embodiments, the network 106 is a combination of a wired network and a wireless network. In some embodiments, the network 106 is the Internet. The transaction-bound attributes allocation server 108 may be a serverless backend hardware or cloud.

The one or more user devices 104A-N may be, without limitation, selected from a mobile phone, a Personal Digital Assistant (PDA), a tablet, a desktop computer, or a laptop. The transaction-bound attributes allocation server 108 includes a memory that stores a set of instructions, and a processor, which when executed by the processor causes dynamic allocation of the transaction-bound attributes based on the personalized waiting period. The transaction-bound attributes allocation server 108 applies the first ML model 110 on a historical transaction dataset of members performing transactions with entities to obtain a predicted transaction dataset. The predicted transaction dataset includes transaction identifier (ID), category of product related to the transaction ID, transaction amount that is spent for the category of the product, member ID related to the transaction ID, a location, and time of day of the transaction place where the transaction occurs, predicted risk level assigned to each transaction associated with each member in the historical transaction dataset or fraudulent activity history. The predicted transaction dataset includes a risk level assigned to each transaction in the historical transaction dataset.

Table: 1 depicts an exemplary predicted transaction dataset

TABLE 1

| Transaction ID | Category | Amount | Member ID | Location | Time of Day | Predicted Risk Level | predicted risk |
|---|---|---|---|---|---|---|---|
| T001 | Electronics | $500 | 102 | Online | Evening | High | Fraudulent |
| T002 | Grocery | $50 | 204 | In-store | Morning | Low | Genuine |
| T003 | Apparel | $300 | 308 | Online | Late Night | Medium | Refund Requested |
| T004 | Travel | $1500 | 410 | Online | Afternoon | High | Fraudulent |
| T005 | Home Appliances | $800 | 501 | In-store | Evening | Low | Genuine |

The first ML model 110 assesses the risk level associated with certain types of transactions based on their characteristics. For example, high-value transactions are electronics, apparel, and home appliances as shown in Table 1. But the transactions are occurred by the member ID in unusual times like "late night apparel purchases" because the transactions made during off-peak times, deviate from member or consumer behavior patterns. This is predicted as medium fraudulent activity. The first ML model 110 utilizes the clustering algorithm for detecting anomaly transactions of each member ID that indicate fraudulent activities or transactions with a higher propensity for refunds. The clustering algorithm may be K-means, Density-Based Spatial Clustering of Applications with Noise (DBSCAN), or Gaussian Mixture Models (GMM). The system 100 extracts features in the historical transaction dataset using at least one of feature extraction methods. The features may be transaction amount, transaction time, location, type of purchase, member loyalty tier, frequency of transactions, and historical refund or fraud markers. The system 100 preprocesses the features at different scales and ranges using a normalization method and dimensionality reduction method. The clustering algorithm groups the transactions into clusters based on their similarity across the features to identify anomalous transactions in the historical dataset. For example, extremely high-value transactions or transactions at odd hours are predicted as the anomalous transactions.

The transaction-bound attributes allocation server 108 performs the first ML model 110 on a historical member dataset to obtain a predicted member dataset. The predicted member dataset has a risk level assigned to each member in the historical member dataset. The historical member data includes but is not limited to, a member identifier (ID), a member category, a total spending amount, a number of returns, and a fraudulent activity history. The clustering algorithm used to identify unusual activities that deviate from a member's transaction patterns member's behavior pattern.

Table 2: depicts an exemplary predicted member dataset

TABLE 2

| Member ID | Loyalty tier | Total spend (last year) | Number of Returns | Fraudulent Activity History | Predicted Risk Level | Predicted Risk |
|---|---|---|---|---|---|---|
| 102 | Silver | $2000 | 5 | Yes | High | Fraudulent |
| 204 | Gold | $5000 | 1 | No | Low | Genuine |
| 308 | Bronze | $1000 | 10 | No | Medium | Refund Requested |
| 410 | Platinum | $10000 | 0 | Yes | High | Fraudulent |
| 501 | Gold | $7000 | 2 | No | low | Genuine |

The first ML model 110 predicts the risk level associated with the members by identifying the members who have engaged in fraudulent activities in the past and exhibit a pattern of frequent returns, irrespective of their loyalty tier and total spend as shown in Table 2.

The transaction-bound attributes allocation server 108 performs the first ML model 110 on a historical entity dataset to obtain a predicted entity dataset. The predicted entity dataset has a risk level assigned to each entity in the historical entity dataset. The historical entity data includes, but is not limited to, (a) an entity identifier (ID), (b) an entity type, (c) an average transaction value, (d) a historical fraud level, and (e) a historical refund request level. The clustering algorithm is applied to entities to identify the transaction that is frequently included in the anomalous transactions.

Table 3: depicts an exemplary predicted entity dataset

TABLE 3

| Entity ID | Type | Average transaction value | Reported Frauds | Refund requests | Predicted Risk Level | Predicted Risk |
|---|---|---|---|---|---|---|
| E01 | Online Retailer | $300 | High | Moderate | High | Fraudulent |

TABLE 3-continued

| Entity ID | Type | Average transaction value | Reported Frauds | Refund requests | Predicted Risk Level | Predicted Risk |
|---|---|---|---|---|---|---|
| E02 | Super market | $50 | Low | Low | Low | Genuine |
| E03 | Clothing store | $150 | Moderate | High | Medium | Refund Requested |
| E04 | Travel Agency | $2000 | High | Low | High | Fraudulent |
| E05 | Electronics | $500 | Low | Moderate | low | Genuine |

The first ML model 110 predicts the risk level associated with the entity based on average transaction values or a history of reported frauds. If the entity has high average transaction values or a history of reported frauds, the first ML model 110 predicts a status of the entity is high-risk.

The transaction-bound attributes allocation server 108 performs preprocessing on the predicted transaction dataset, the predicted member dataset, and the predicted entity dataset using data cleaning method, data preparation method, and data normalization method to obtain preprocessed predicted transaction dataset, the predicted member dataset, and the predicted entity dataset. The preprocessed predicted transaction dataset, the predicted member dataset, and the predicted entity dataset are used as training data. The transaction-bound attributes allocation server 108 trains the second machine learning model 112 based on correlation and patterns in (a) the preprocessed predicted transaction dataset, (b) the preprocessed predicted member dataset, and (c) the preprocessed predicted entity dataset.

The transaction-bound attributes allocation server 108 dynamically generates the personalized waiting period for the obtained transaction-bound attributes using the trained second machine learning model 112. The transaction-bound attributes allocation server 108 obtains the transaction-bound attributes corresponding to each transaction associated with the one or more members 102A-N. The transaction-bound attributes allocation server 108 obtains the transaction-bound attributes at a time of issuance to the respective member accounts associated with the one or more members 102A-N upon the completion of each transaction performed by the one or more members 102A-N. The transaction-bound attributes are rewards that are associated with a particular transaction. The transaction-bound attributes are earned or accrued based on nature of the transaction, value of the transaction, or frequency of the transaction. The transaction-bound attributes may be awarded to the one or more members 102A-N or participants in a loyalty or rewards program. For example, the member 102A may earn transaction-bound attributes when making a purchase, and the transaction-bound attributes are credited to their account as part of a reward program. The transaction-bound attributes can be redeemed for discounts, merchandise, or other benefits.

The transaction-bound attributes allocation server 108 determines the personalized state of the transaction-bound attributes for each member account using the second machine learning model 112. The personalized state may be a pending state or an available state that is personalized to each member account. The second ML model 112 determines the personalized state for each transaction-bound attribute based on various factors related to behavior and interactions of the one or more members 102A-N. The various factors may include spending behavior of the one or more members 102A-N, a transactional activity of the one or more members 102A-N, an online action performed on social media by the one or more members 102A-N, or an engagement level of the one or more members 102A-N with loyalty programs. The spending behavior analysis means how much and how often the one or more members 102A-N spend within the loyalty programs. The transactional activity may include the frequency of transactions, types of transactions (e.g., high-value purchases), the number of transactions completed, the types of products purchased, and an average transaction amount.

The second ML model 112 assesses tendencies of the one or more members 102A-N towards fraud transactions. For example, if the member 102A plans to book a flight two months in advance, the second ML model 112 delays the redemption of the transaction-bound attributes of the member 102A to prevent misuse, as cancellation of the flight ticket after transaction-bound attributes redemption could lead to fraud. The transaction-bound attributes are issued immediately to the user 102A for further use if the second ML model 112 determines the member 102A to be a trusted member. The second machine learning model 112 either places the transaction-bound attributes in the pending state or the available state which means the second ML model 112 determines whether to delay the processing of each transaction-bound attribute (the pending state) in each member account or make the transaction-bound attributes immediately accessible (the available state) to the member 102A. The transaction-bound attributes being pending indicates that there might be a delay or hold on their utilization. The transaction-bound attributes being placed in the available state indicates that the transaction-bound attributes are ready for immediate use.

In an example scenario, the member 102A purchases a phone. The cost of the phone is $600. The transaction-bound attributes allocation server 108 issues the transaction-bound attributes to the member 102A for his/her $600 purchase. The transaction-bound attributes are specific to this transaction of $600. The second ML model 112 analyzes the purchase of the member 102A purchase and determines the personalized state for the transaction-bound attributes of the member 102A. The transaction-bound attributes allocation server 108 places the transaction-bound attributes of the member 102A in the pending state as the member 102A frequently returned their purchased items in their past orders, even though the member 102A has a consistent record of legitimate purchase. If the transaction-bound attributes of the member 102A are placed in the pending state, the member 102A is disabled from immediately redeeming the transaction-bound attributes.

In another example, the member 102B purchased electronics for a cost of $500. The member 102B is a frequent shopper and often redeems the transaction-bound attributes immediately. The member 102C purchased clothing for $150. The member 102C occasionally makes purchases and receives the transaction-bound attributes. The member 102D purchased groceries at $50. The member 102E is new to the loyalty program and has not redeemed any attributes yet. The transaction-bound attributes of the member 102B might be predicted to be in the available state (i.e., redeemable state) since the member 102B made a high-value purchase and exhibited loyal behavior. The transaction-bound attributes of the member 102C may also be in the available state because clothing is a category where the members might value quicker rewards and the member 102C tends to save the transaction-bound attributes. The member 102D's transaction-bound attributes might be determined to be pending as the purchase value is relatively lower since the loyalty value of the member 102D and redemption history are not well-established.

Table: 4 depicts an exemplary personalized state for the transaction-bound attributes

TABLE 4

| Member ID | Total Spend (Last 6 Months) | Number of Transactions | Avg Transaction Value | Member Loyalty Tier | Returned Items | personalized state for the transaction-bound attributes |
|---|---|---|---|---|---|---|
| E01 | $500 | 10 | $50 | Gold | 0 | Immediate |
| E02 | $300 | 5 | $60 | Silver | 2 | Immediate |
| E03 | $1000 | 20 | $50 | Platinum | 1 | Pending |
| E04 | $200 | 15 | $13.33 | Bronze | 3 | Pending |
| E05 | $800 | 8 | $100 | Gold | 0 | Immediate |

The transaction-bound attributes allocation server 108 dynamically determines the personalized waiting period in real-time for the transaction-bound attributes that are placed in the pending state using the second ML model 112 with a set of rules. The second ML model 112 analyzes the location of each transaction, the type of transaction, a persona of each member 102A, or a product category associated with the transaction-bound attributes using the set of rules. The persona of each member 102A is generated by (i) obtaining the historical member dataset associated with the one or more members 102A-N, and (ii) segmenting the historical member data by analyzing a relationship and pattern between the historical member dataset. The historical member data includes at least one age, gender, location, behavioral data, and purchase history of the one or more members 102A-N.

The second ML model 112 determines the personalized waiting period for each pending transaction-bound attribute by estimating the time required for the transaction-bound attributes in the pending state to become available to the one or more members 102A-N. The time required for the transaction-bound attributes in the pending state is estimated based on (a) at least one of (i) the spending behavior of the one or more members 102A-N, or (ii) the transactional activity of the one or more members 102A-N, or (iii) fraud activity of the one or more members 102A-N, and (b) a return period of the product category that matches the transaction performed by the one or more members 102A-N.

For example, if a flight is booked by the member, the member can earn 1000 transaction-bound attributes. If the member later cancels the flight, this falls into the accrual cancellation category. For example, the member has accumulated 1000 reward attributes. In case the member used previously earned reward attributes (e.g., 1000 attributes) to pay for a bill, but the member subsequently canceled the flight later, which is redemption cancellation or burn cancellation.

For example, if the member 102B has a history of making high-value purchases sporadically and frequently returns their purchased items in their past orders, the second ML model 112 estimates a shorter waiting period for the transaction-bound attributes that are pending. If the member 102C has a history of moderate-value purchases regularly and infrequent purchased items returned in past orders, the second ML model 112 determines the waiting period to be moderate for the member 102B. For example, the moderate waiting period is 7 days, which means member 102C must wait 7 days from the date of purchase before the member 102C can redeem the transaction-bound attributes (e.g., 100 transaction-bound attributes) in the pending state. Once the 7-day waiting period is completed, the member 102C can use the 100 transaction-bound attributes as a discount on their next purchase. The transaction-bound attributes in the pending state may become available around the end of the return period for clothing. The member 102C has low-value purchases on a rare basis and frequently returns their purchased items in their past orders, the second ML model 112 predicts a longer waiting period for the member 102C.

The transaction-bound-attributes in the pending state are stored in a holding unit. The transaction-bound attributes within the holding unit are automatically moved to the available transaction-bound attributes upon expiration of the personalized waiting period of the transaction-bound attributes in the pending state based on a time-to-live (TTL). The TTL is a numerical value utilized for data validity or expiration means data should remain valid and available over a period in the holding unit. The transaction-bound attributes allocation server 108 receives available transaction-bound attributes redemption requests from the at least one user device 104A-N associated the one or more members 102A-N. Upon receiving the available transaction-bound attributes redemption request from the one or more user devices 104A-N, the transaction-bound attributes allocation server 108 automatically determines available transaction-bound attributes in real-time for the at least one member 102A account based on the personalized waiting period of the transaction-bound attributes that are pending. The transaction-bound attributes in the available state are determined by subtracting the transaction-bound attributes in the pending state from the transaction-bound attributes.

In some embodiments, the transaction-bound attributes allocation server 108 discards the transaction-bound attributes from the holding unit if the TTL of the transaction-bound attributes in the holding unit has expired. For example, if the member 102C is a loyal customer of an online store and purchases a dress worth $150 and earns 10 transaction-bound attributes, the transaction-bound attributes are added to the member account of the member 102C in the pending state. The system 100 of the online store has the TTL setting of 90 days for the transaction-bound attributes in the pending state, where any pending transaction-bound attributes in member 102C's account will expire and be removed from the holding unit if the member 102C is not used within the next 90 days. The transaction-bound attributes allocation server 108 starts a countdown for the transaction-bounding attributes of the member 102C when the transaction-bound attributes are added to the pending state. The countdown begins from the moment the transaction-bound attributes are placed in the pending state. For example, the member 102C was made on January 1st. If the member 102C does not use the transaction-bound attributes that are pending, within the next 90 days, the TTL will expire on March 31st. On April 1st, the transaction-bound attributes allocation server 108 will recognize that the transaction-bound attributes associated with the member 102C purchase on January 1st have exceeded their TTL and are no longer valid. On April 1st, the transaction-bound attributes allocation server 108 will automatically remove the expired transaction-bound attributes that are pending from the member 102C's account.

Table: 5 depicts an exemplary table of the holding unit. The holding unit includes transaction-bound attributes that are pending.

TABLE 5

| Member Id | Transaction pending Attributes Id | Account Id | Transaction bound attributes | TTL |
|---|---|---|---|---|
| M123456 | 19274710 | 43233121 | 200 | 2022-09-13T12:26:06+00:00 |

Table: 1 includes a record of pending transaction-bound attributes earned by the member (identified by Member ID "M123456") for the member account (Account ID "43233121"). The transaction-bound attributes that are pending have a value of 200 and are associated with an identifier (ID) "19274710" of the transaction-bound attributes that are pending. The transaction-bound attributes are pending and need to be processed before the expiration time specified in the TTL column.

In some embodiments, if the transaction is related to the government, the transaction-bound attributes allocation server 108 instantly issues the transaction-bound attributes to the member and places the transaction-bound attributes in the available state. If the transaction is related to the booking of a flight two months in advance, the transaction-bound attributes allocation server 108 places the transaction-bound attributes in the waiting period. If the transaction is related to the booking of the flight by a privileged member, transaction-bound attributes allocation server 108 issues the transaction-bound attributes instantly redeemable to the privileged member. Thereby, the transaction-bound attributes allocation server 108 dynamically allocates the transaction-bound attributes associated with each member account based on the generated personalized waiting period of the transaction-bound attributes and securing the allocation of the transaction-bound attributes against anomalous transactions.

Figure 2:
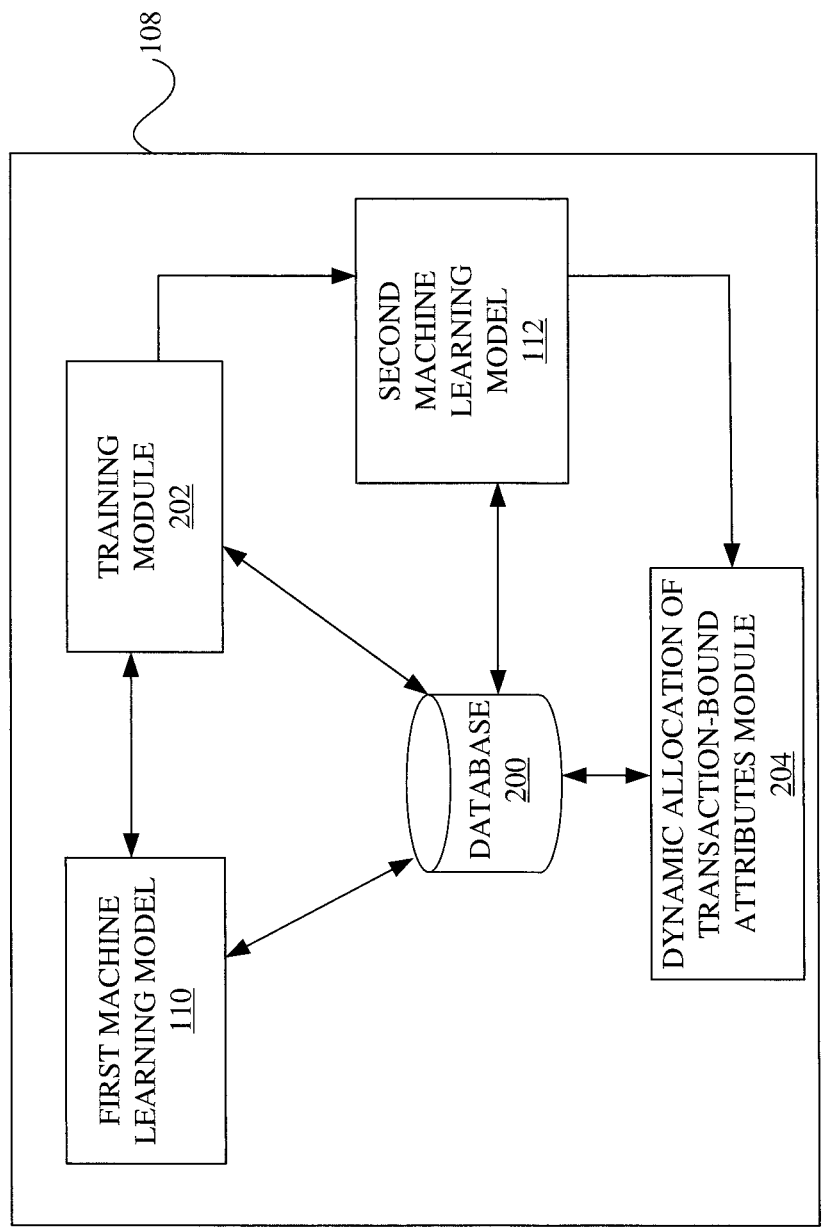
FIG. 2 is an exploded view of a transaction-bound attributes allocation server of FIG. 1, according to some embodiments herein.

FIG. 2 is an exploded view of a transaction-bound attributes allocation server 108 of FIG. 1, according to some embodiments herein. The transaction-bound attributes allocation server 108 includes a first machine learning (ML) model 110, a training module 202, a second machine learning model 112, dynamic transaction-bound attributes allocating module 204, and a database 200. The first ML model 110 is applied to a historical transaction dataset of members performing transactions with entities to obtain a predicted transaction dataset that has a risk level assigned to each transaction in the historical transaction dataset. The first ML model 110 is applied to a historical member dataset to obtain a predicted member dataset that has a risk level assigned to each member in the historical member dataset. The historical member data includes one or more (a) a member identifier, (b) a member category, (c) a total spending, (d) a number of returns, and (e) a fraudulent activity history. The first ML model 110 is applied to a historical entity dataset to obtain a predicted entity dataset that has a risk level assigned to each entity in the historical entity dataset. The historical entity dataset includes one or more (a) an entity identifier, (b) an entity type, (c) an average transaction value, (d) a historical fraud level, and (e) a historical refund request level.

The training module 202 trains the second ML model 112 based on correlation and patterns in (a) the predicted transaction dataset, (b) the predicted member dataset, and (c) the predicted entity dataset. The second ML model 112 dynamically generates the personalized waiting period for the transaction-bound attributes. The personalized waiting period is generated by (i) obtaining the transaction-bound attributes for each transaction associated with at least one member account when the transaction-bound attributes are issued to the at least one member account associated with the at least one member upon each transaction being performed by the at least one member, (ii) determining the personalized state of the transaction-bound attributes for each member account using the second ML model, and (iii) dynamically determining the personalized waiting period in real-time for the transaction-bound attributes that are placed in the pending state by analyzing at least one of location of each transaction, a transaction type, a persona of the at least one member, or product category associated with the transaction-bound attributes using the second ML model with a set of rules.

The personalized state includes a pending state or an available state. The transaction-bound-attributes in the pending state are stored in a holding unit. The transaction-bound attributes within the holding unit are automatically moved to the available transaction-bound attributes upon the expiration of the waiting period of the transaction-bound attributes in the pending state based on a time-to-live (TTL). The transaction-bound attributes allocating module 204 dynamically allocate the transaction-bound attributes associated with at least one member account based on the generated personalized waiting period of the transaction-bound attributes, thereby securing the allocation of the transaction-bound attributes against anomalous transactions.

FIG. 3A is an exemplary diagram of a user interface view 300A that displays transaction-bound attributes related to a member ID 304 and a personalized state of transaction-bound attributes according to some embodiments herein. The user interface view 300A depicts behavior, influence, and transaction (BIT) details at 302 that includes a BIT date and time that is "03/04/2024, and 2:09 PM", indicating that a transaction was performed by the member ID 304 on Mar. 4, 2024, at 2:09 PM with sponsor "ABC Airways". The transaction is categorized as "accrual", that means the member ID has either earned the transaction bound attributes or is in the process of earning the transaction-bound attributes. The transaction bound attributes are shown to be processed on Mar. 4, 2024 for the transaction. The user interface view 300A depicts a detail of transaction-bound attributes 306.

For example, the member "ID C_A0124A0263" associated with the member ID 304 accrued 1000 transaction-bound attributes as a bonus for booking a one-way flight ticket with an economy seat. The member "ID C_A0124A0263" associated with the member ID 304 accrued 110 points as a Sunday bonus for an ordered beverage s on the Sunday. The member ID "C_A0124A0263" associated with the member accrued 2000 points as a "base" reward for booking a round trip with a business class seat.

The second ML model 112 obtains the transaction-bound attributes from the member ID and analyses the transaction-bound attributes to determine a personalized state of the transaction-bound attributes. For example, the second ML model 112 places (i) the accrued 1000 points under the "bonus" tag in an available state until their expiry date of May 5, 2024, (ii) the accrued 110 points under a "Sunday bonus' tag in an available state. The member ID associated with the member can redeem 110 points at any time, and (iii) the accrued 2000 points under the "base" reward tag in an available state until expiry date of 17 Apr. 2024 of the accrued 2000 points.

FIG. 3B is an exemplary diagram of user interface view 300B that displays transaction-bound attributes related to member ID 310 and a personalized state of transaction-bound attributes according to some embodiments herein. The user interface view 300A depicts behavior, influence, and transaction (BIT) ID for a member ID at 310 associated with the member. The user interface view 300B depicts behavior, influence, and transaction (BIT) details at 308 that includes a BIT date and time that is "03/04/2024, and 2:09 PM indicating that a transaction was performed by the member ID 310 on Mar. 4, 2024, at 2:09 PM with sponsor "ABC Airways". The transaction is categorized as "accrual". The transaction-bound attributes are shown to be processed on Mar. 4, 2024 for the transaction. The user interface view 300B depicts a detail of transaction-bound attributes at 312.

For example, the member ID "C_A0124A0264" associated with the member ID 310 accrued 2000 transaction-bound attributes as a bonus for booking a one-way flight ticket with an economy seat. The member ID "C_A0124A0264" associated with the member 310 accrued 110 points as a Sunday bonus for an ordered beverage. The member "ID C_A0124A0264 associated with the member 310 accrued 1000 points as a base offer for booking a round trip with a business class seat. The second ML model 112 obtains the transaction-bound attributes from the member ID "C_A0124A0264" and analyses the transaction-bound attributes to determine a personalized state of the transaction-bound attributes. For example, the second ML model 112 places the accrued 2000 points that are under "bonus" tag in a pending state with a waiting period of two months from Mar. 4, 2024. The system 100 continuously monitors and analyze the member behavior and transaction history of member 310 in real time in between 60 days using the second ML model 112. If an activity of the member 310 is detected as fraudulent, the second ML model 112 cancels redeem access to the member 310. If the activity of the member 310 detected as genuine, the system allows the member 310 to redeem the 2000 points, which will expire on 30 May 2024. The second ML model 112 places the accrued 110 points that are under the "Sunday bonus" tag in the pending state with a waiting period of one day from Mar. 4, 2024. The system 100 continuously monitors and analyses the member behavior and transaction history of the member 310 in real time in between the one day using the second ML model 112. If an activity of the member 310 is detected as fraudulent, the second ML model 112 cancels redeem access to the member 310. If the activity of the member 310 is detected as genuine, the system allows the member 310 to redeem the 110 points, which will expire on Oct. 4, 2024.

The second ML model 112 places the accrued 110 points that are under "base" tag in the pending state with a waiting period of one month from Mar. 4, 2024. The system 100 continuously monitor and analyse the member behavior and transaction history of the member 310 in real time for the one month using the second ML model 112. If the activity of the member 310 detected as fraudulent, the second ML model 112 cancels redeem access to the member 310. If the activity of the member 310 is detected as genuine, the system allows the member 310 to redeem the 1000 points, which will expire on 17 May 2024.

Figure 3C:
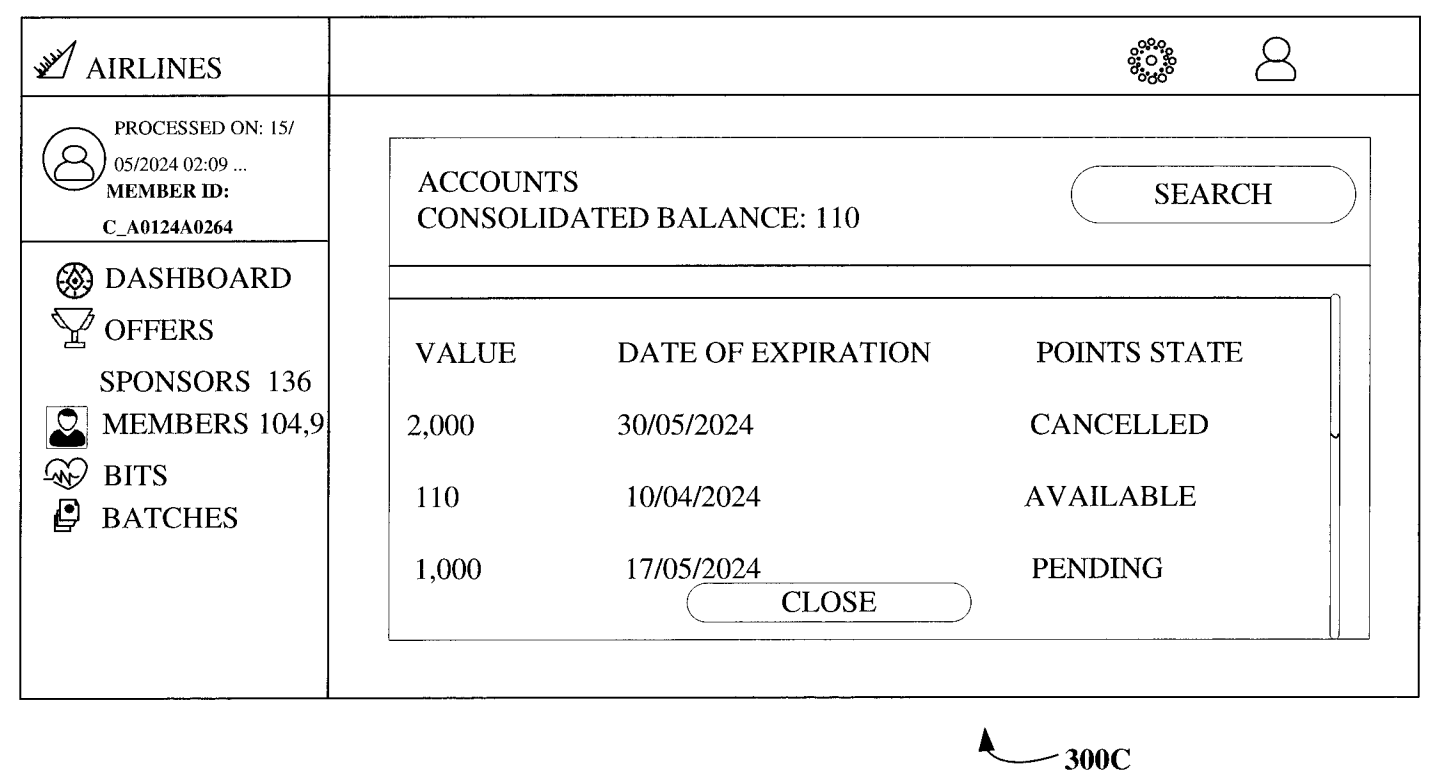

FIG. 3C is an exemplary diagram of a user interface view 300C that illustrates consolidated transaction-bound attributes of member ID "C_A0124A0264" over one month of FIG. 3B according to some embodiments herein. The user interface view 300C depicts a consolidated balance that is transaction bound attributes that are pending over one month from the Mar. 4, 2024, is 2000 because the second ML model 112 which (i) released 110 points to the available state and the member "C_A0124A0264" redeemed 110 points, (ii) place 1000 points are pending in a holding unit, and (iii) cancel the redeem access for 2000 points as the second ML model 112 identifies the member's cancellation of a one-way flight ticket with an economy seat over one month.

FIGS. 4A and 4B are flow diagrams that illustrate a method for dynamically allocating transaction-bound attributes associated with at least one member account by generating a personalized waiting period of the transaction-bound attributes using a machine learning model according to some embodiments herein. At step 402, the method includes performing, using a processor, a first machine learning (ML) model on a historical transaction dataset of members performing transactions with entities to obtain a predicted transaction dataset that has a risk level assigned to each transaction in the historical transaction dataset. The method includes performing, using the processor, the first ML model on a historical member dataset to obtain a predicted member dataset that has a risk level assigned to each member in the historical member dataset. The historical member data includes one or more (a) a member identifier, (b) a member category, (c) a total spending, (d) a number of returns, and (e) a fraudulent activity history. The method includes performing, using the processor, the first ML model on a historical entity dataset to obtain a predicted entity dataset that has a risk level assigned to each entity in the historical entity dataset. The historical entity data includes one or more (a) entity identifiers, (b) an entity type, (c) an average transaction value, (d) a historical fraud level, and (e) a historical refund request level. At step 404, the method includes training a second machine learning (ML) model based on correlation and patterns in (a) the predicted transaction dataset, (b) the predicted member dataset, and (c) the predicted entity dataset.

At step 406, the method includes dynamically generating the personalized waiting period for the transaction-bound attributes using the second ML model. The personalized waiting period is generated by (i) obtaining the transaction-bound attributes for each transaction associated with at least one member account when the transaction-bound attributes are issued to the at least one member account associated with the at least one member upon each transaction being performed by the at least one member, (ii) determining, using the second ML model, the personalized state of the transaction-bound attributes for each member account, and (iii) dynamically determining in real-time, using the second ML model with a set of rules, the personalized waiting period for the transaction-bound attributes that are placed in the pending state by analyzing at least one of location of each transaction, a transaction type, a persona of the at least one member, or product category associated with the transaction-bound attributes. The personalized state includes a pending state or an available state. The transaction-bound-attributes in the pending state are stored in a holding unit. The transaction-bound-attributes in the pending state are stored in a holding unit. At step 408, the method includes dynamically allocating the transaction-bound attributes associated with at least one member account based on the generated personalized waiting period of the transaction-bound attributes, thereby securing the allocation of the transaction-bound attributes against anomalous transactions.

The embodiments herein may include a computer program product configured to include a pre-configured set of instructions, which when performed, can result in actions as stated in conjunction with the methods described above. For example, the pre-configured set of instructions can be stored on a tangible non-transitory computer-readable medium or a program storage device. For example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. The embodiments herein can include both hardware and software elements. The embodiments that are implemented in software include but are not limited to, firmware, resident software, microcode, etc. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, attributing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

Figure 5:
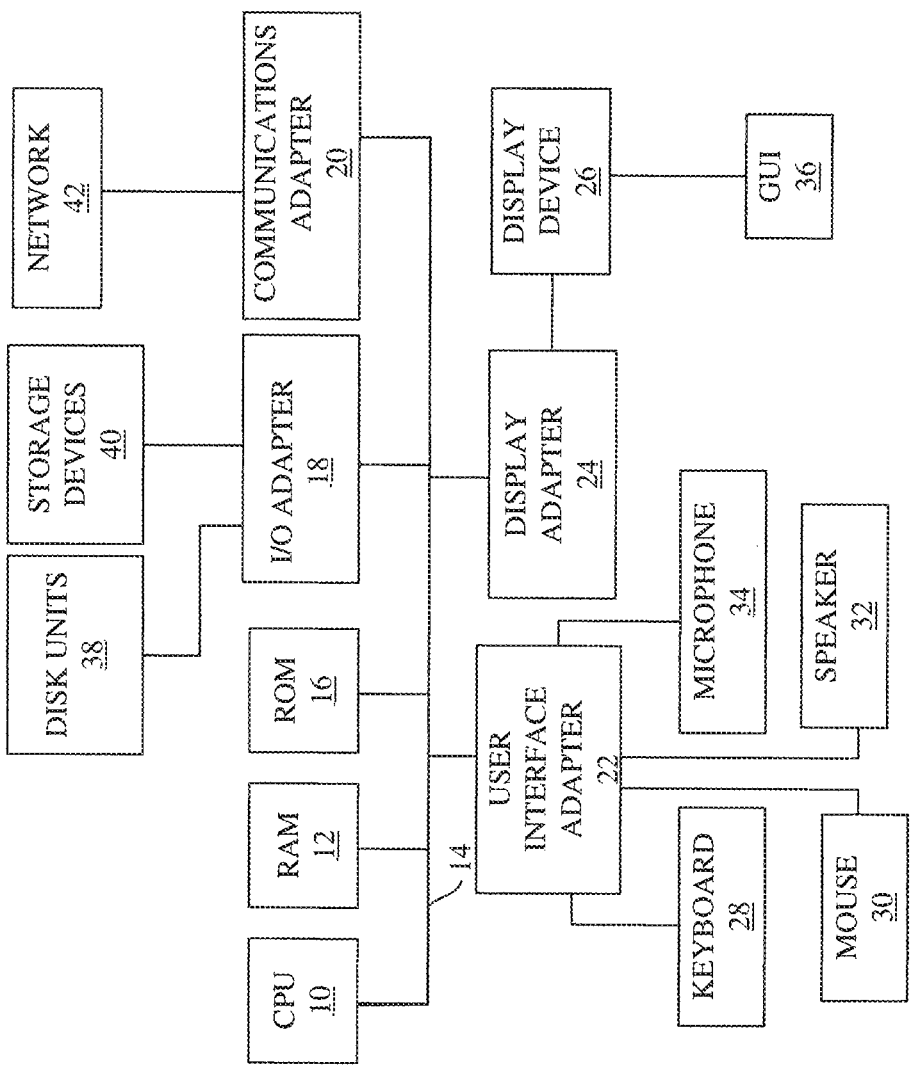
FIG. 5 is a schematic diagram of a computer architecture in accordance with some embodiments herein.

A representative hardware environment for practicing the embodiments herein is depicted in FIG. 5, with reference to FIGS. 1 through 4A-B. This schematic drawing illustrates a hardware configuration of the AI model/a computer system/a user device 104 in accordance with the embodiments herein. The user device 104 includes at least one processing device 10 and a cryptographic processor 11. The special-purpose CPU 10 and the cryptographic processor (CP) 11 may be interconnected via system bus 14 to various devices such as random-access memory (RAM) 15, read-only memory (ROM) 16, and an input/output (I/O) adapter 17. The I/O adapter 17 can connect to peripheral devices, such as disk unit 12 and tape drive 13, or other program storage devices that are readable by the system. The user device 104 can read the inventive instructions on the program storage devices and follow these instructions to execute the methodology of the embodiments herein. The user device 104 further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for dynamically allocating transaction-bound attributes associated with at least one member account by generating a personalized waiting period of the transaction-bound attributes using a machine learning model, thereby securing the allocation of the transaction-bound attributes against anomalous transactions, wherein the method comprises:

performing, using a processor, a first machine learning (ML) model on a historical transaction dataset of members performing transactions with entities to obtain a predicted transaction dataset that has a risk level assigned to each transaction in the historical transaction dataset;

performing, using the processor, the first ML model on a historical member dataset to obtain a predicted member dataset that has a risk level assigned to each member in the historical member dataset, wherein the historical member data comprises a plurality of (a) a member identifier, (b) a member category, (c) a total spending, (d) a number of returns, and (e) a fraudulent activity history;

performing, using the processor, the first ML model on a historical entity dataset to obtain a predicted entity dataset that has a risk level assigned to each entity in the historical entity dataset, wherein the historical entity data comprises a plurality of (a) an entity identifier, (b) an entity type, (c) an average transaction value, (d) a historical fraud level, and (e) a historical refund request level;

training a second machine learning (ML) model based on correlation and patterns in (a) the predicted transaction dataset, (b) the predicted member dataset, and (c) the predicted entity dataset;

dynamically generating the personalized waiting period for the transaction-bound attributes using the second ML model, wherein the personalized waiting period is generated by:

obtaining the transaction-bound attributes for each transaction associated with at least one member account when the transaction-bound attributes are issued to the at least one member account associated with the at least one member upon each transaction being performed by the at least one member, determining, using the second ML model, the personalized state of the transaction-bound attributes for each member account, wherein the personalized state comprises a pending state or an available state, wherein the transaction-bound-attributes in the pending state are stored in a holding unit, and dynamically determining in real-time, using the second ML model with a set of rules, the personalized waiting period for the transaction-bound attributes that are placed in the pending state by analyzing at least one of location of each transaction, a transaction type, a persona of the at least one member, or product category associated with the transaction-bound attributes; and dynamically allocating the transaction-bound attributes associated with at least one member account based on the generated personalized waiting period of the transaction-bound attributes, thereby securing the allocation of the transaction-bound attributes against anomalous transactions.

2. The processor-implemented method of claim 1, wherein the method comprises automatically determining in real-time, upon receiving an available transaction-bound attributes redemption request from a user device, available transaction-bound attributes for the at least one member account based on the personalized waiting period of the transaction-bound attributes that are pending, wherein the transaction-bound attributes within the holding unit are automatically moved to the available transaction-bound attributes upon the expiration of the personalized waiting period of the transaction-bound attributes in the pending state based on a time-to-live (TTL).

3. The processor-implemented method of claim 2, wherein the TTL is a numerical value utilized for data validity or expiration means data should remain valid and available over a period in the holding unit.

4. The processor-implemented method of claim 1, wherein the method further comprises training the second ML model which further comprises performing at least one of (a) data cleaning method, (b) data preparation method, and (c) data normalization method on the (i) the predicted transaction dataset, (ii) the predicted member dataset, and (ii) the predicted entity dataset.

5. The processor-implemented method of claim 1, wherein the transaction-bound attributes in the available state are determined by subtracting the transaction-bound attributes in the pending state from the transaction-bound attributes.

6. A system for dynamically allocating transaction-bound attributes associated with at least one member account by generating a personalized waiting period of the transaction-bound attributes using a machine learning model, thereby securing the allocation of the transaction-bound attributes against anomalous transactions, wherein the system comprises:

a memory that includes a set of instructions;

a processor executes the set of instructions and is configured to:

perform using a processor, a first machine learning (ML) model on a historical transaction dataset of members performing transactions with entities to obtain a predicted transaction dataset that has a risk level assigned to each transaction in the historical transaction dataset;

perform, using the processor, the first ML model on a historical member dataset to obtain a predicted member dataset that has a risk level assigned to each member in the historical member dataset, wherein the historical member data comprises a plurality of (a) a member identifier, (b) a member category, (c) a total spending, (d) a number of returns, and (e) a fraudulent activity history;

perform, using the processor, the first ML model on a historical entity dataset to obtain a predicted entity dataset that has a risk level assigned to each entity in the historical entity dataset, wherein the historical entity data comprises a plurality of (a) an entity identifier, (b) an entity type, (c) an average transaction value, (d) a historical fraud level, and (e) a historical refund request level;

train a second machine learning (ML) model based on correlation and patterns in (a) the predicted transaction dataset, (b) the predicted member dataset, and (c) the predicted entity dataset;

dynamically generate the personalized waiting period for the transaction-bound attributes using the second ML model, wherein the personalized waiting period is generated by:

obtaining the transaction-bound attributes for each transaction associated with at least one member account when the transaction-bound attributes are issued to the at least one member account associated with the at least one member upon each transaction being performed by the at least one member, determining, using the second ML model, the personalized state of the transaction-bound attributes for each member account, wherein the personalized state comprises a pending state or an available state, wherein the transaction-bound-attributes in the pending state are stored in a holding unit, and dynamically determining in real-time, using the second ML model with a set of rules, the personalized waiting period for the transaction-bound attributes that are placed in the pending state by analyzing at least one of location of each transaction, a transaction type, a persona of the at least one member, or product category associated with the transaction-bound attributes; and dynamically allocating the transaction-bound attributes associated with at least one member account based on the generated personalized waiting period of the transaction-bound attributes, thereby securing the allocation of the transaction-bound attributes against anomalous transactions.

7. The system of claim 6, wherein the processor is configured to automatically determine in real-time, upon receiving an available transaction-bound attributes redemption request from a user device, available transaction-bound attributes for the at least one member account based on the personalized waiting period of the transaction-bound attributes that are pending, wherein the transaction-bound attributes within the holding unit are automatically moved to the available transaction-bound attributes upon the expiration of the personalized waiting period of the transaction-bound attributes in the pending state based on a time-to-live (TTL).

8. The system of claim 7, wherein the TTL is a numerical value utilized for data validity or expiration means data should remain valid and available over a period in the holding unit.

9. The system of claim 6, wherein the processor is further configured to train the second ML model which further comprises performing at least one of (a) data cleaning method, (b) data preparation method, and (c) data normalization method on the (i) the predicted transaction dataset, (ii) the predicted member dataset, and (iii) the predicted entity dataset.

10. The system of claim 6, wherein the transaction-bound attributes in the available state are determined by subtracting the transaction-bound attributes in the pending state from the transaction-bound attributes.

11. One or more non-transitory computer-readable storage mediums storing one or sequences of instructions, which when executed by one or more processors, causes a method for dynamically allocating transaction-bound attributes associated with at least one member account by generating a personalized waiting period of the transaction-bound attributes using a machine learning model, thereby securing the allocation of the transaction-bound attributes against anomalous transactions, wherein the method comprises:

performing, using a processor, a first machine learning (ML) model on a historical transaction dataset of members performing transactions with entities to obtain a predicted transaction dataset that has a risk level assigned to each transaction in the historical transaction dataset;

performing, using the processor, the first ML model on a historical member dataset to obtain a predicted member dataset that has a risk level assigned to each member in the historical member dataset, wherein the historical member data comprises a plurality of (a) a member identifier, (b) a member category, (c) a total spending, (d) a number of returns, and (e) a fraudulent activity history;

performing, using the processor, the first ML model on a historical entity dataset to obtain a predicted entity dataset that has a risk level assigned to each entity in the historical entity dataset, wherein the historical entity data comprises a plurality of (a) an entity identifier, (b) an entity type, (c) an average transaction value, (d) a historical fraud level, and (e) a historical refund request level;

training a second machine learning (ML) model based on correlation and patterns in (a) the predicted transaction dataset, (b) the predicted member dataset, and (c) the predicted entity dataset;

dynamically generating the personalized waiting period for the transaction-bound attributes using the second ML model, wherein the personalized waiting period is generated by:

obtaining the transaction-bound attributes for each transaction associated with at least one member account when the transaction-bound attributes are issued to the at least one member account associated with the at least one member upon each transaction being performed by the at least one member, determining, using the second ML model, the personalized state of the transaction-bound attributes for each member account, wherein the personalized state comprises a pending state or an available state, wherein the transaction-bound-attributes in the pending state are stored in a holding unit, and dynamically determining in real-time, using the second ML model with a set of rules, the personalized waiting period for the transaction-bound attributes that are placed in the pending state by analyzing at least one of locations of each transaction, a transaction type, a persona of the at least one member, or product category associated with the transaction-bound attributes; and dynamically allocating the transaction-bound attributes associated with at least one member account based on the generated personalized waiting period of the transaction-bound attributes, thereby securing the allocation of the transaction-bound attributes against anomalous transactions.

12. One or more non-transitory computer-readable storage mediums storing one or sequences of instructions of claim 11, which when executed by one or more processors, further comprises automatically determining in real-time, upon receiving an available transaction bound attributes redemption request from a user device, available transaction-bound attributes for the at least one member account based on the personalized waiting period of the transaction-bound attributes that are pending, wherein the transaction-bound attributes within the holding unit are automatically moved to the available transaction-bound attributes upon the expiration of the personalized waiting period of the transaction-bound attributes in the pending state based on a time-to-live (TTL).

13. One or more non-transitory computer-readable storage mediums storing one or sequences of instructions of claim 12, which when executed by one or more processors, further comprises the TTL is a numerical value utilized for data validity or expiration means data should remain valid and available over a period in the holding unit.

14. One or more non-transitory computer-readable storage mediums storing one or sequences of instructions of claim 11, which when executed by one or more processors, further comprises the training of the second ML model which further comprises performing at least one of (a) data cleaning method, (b) data preparation method, and (c) data normalization method on the (i) the predicted transaction dataset, (ii) the predicted member dataset, and (iii) the predicted entity dataset.

15. One or more non-transitory computer-readable storage mediums storing one or sequences of instructions of claim 11, which when executed by one or more processors, further comprises the transaction-bound attributes in the available state are determined by subtracting the transaction-bound attributes in the pending state from the transaction-bound attributes.

* * * * *